United States Patent
Banet et al.

(10) Patent No.: US 7,577,747 B2
(45) Date of Patent: Aug. 18, 2009

(54) ACCESS SERVER FOR WEB BASED SERVICES

(75) Inventors: Franz-Josef Banet, Vaihingen (DE); Rodolfo Lopez Aladros, Stuttgart (DE)

(73) Assignee: Alcatel, Paris (FR)

( * ) Notice: Subject to any disclaimer, the term of this patent is extended or adjusted under 35 U.S.C. 154(b) by 1070 days.

(21) Appl. No.: 10/701,620

(22) Filed: Nov. 6, 2003

(65) Prior Publication Data

US 2004/0098497 A1    May 20, 2004

(30) Foreign Application Priority Data

Nov. 20, 2002    (EP) .................................. 02360320

(51) Int. Cl.
*G06F 15/16*    (2006.01)
(52) U.S. Cl. ..................... 709/230; 709/245; 709/218
(58) Field of Classification Search ................. 709/203, 709/217–232, 246, 238
See application file for complete search history.

(56) References Cited

U.S. PATENT DOCUMENTS

| | | | |
|---|---|---|---|
| 6,323,881 B1 * | 11/2001 | Broulik et al. .............. | 715/744 |
| 6,453,162 B1 * | 9/2002 | Gentry ........................ | 455/433 |
| 6,738,803 B1 * | 5/2004 | Dodrill et al. ............... | 709/218 |
| 6,775,366 B1 * | 8/2004 | Cobbett et al. ......... | 379/201.02 |
| 6,904,137 B2 * | 6/2005 | Brandt et al. ............... | 379/126 |
| 2002/0184373 A1 * | 12/2002 | Maes ......................... | 709/228 |

FOREIGN PATENT DOCUMENTS

| FR | 2 797 065 A | 2/2001 |
|---|---|---|
| WO | WO 98/28885 A1 | 7/1998 |

* cited by examiner

*Primary Examiner*—Yasin M Barqadle
(74) *Attorney, Agent, or Firm*—Sughrue Mion, PLLC (57) ABSTRACT

The invention concerns an access server and a method for integrating web based services in an existing telecommunication network services environment comprising one or several non web based telecom service elements. A non web based telecom service element is registered in a web based description server to make known service properties of said service element to web based service elements. A web based service element sends a service request to the access server, the service request using a web based protocol. The access server converts the service request to a telecom service request and transmits said telecom service request to a corresponding telecom service element using an appropriate telecom protocol. The telecom service element transmits service data to the access server. The access server transmits the received service data using the web based protocol.

11 Claims, 4 Drawing Sheets

Fig. 1

| | |
|---|---|
| 1 | communications network |
| 2 | communications network |
| 7 | access server |
| 11-13 | network elements |
| 21-25 | servers |
| 31-36 | terminals |
| 81-83 | network elements |

Fig. 2

| | |
|---|---|
| 2 | communications network |
| 7 | access server |
| 11-13 | network elements |
| 14-18 | service elements |
| 21-24 | servers |
| 25 | data server |
| 26-28 | data base service functions |
| 29 | common data base |
| 40-46 | service elements |
| 52 | data interface |
| 71-76 | mediation elements |
| 81-83 | network elements |
| 84-88 | service elements |

Fig. 3

| | |
|---|---|
| 11 | network element |
| 14-18 | service elements |
| 20 | service element |
| 21-25 | servers |
| 26 | data base service function |
| 29 | data base |
| 40-46 | service elements |
| 52 | interface |
| 141 | control unit |
| 142-143 | interface units |
| 201 | registration unit |
| 202-204 | service scripts |
| 211 | control unit |
| 240 | control unit |
| 441 | service logic |
| 442-443 | interface unit |

Fig. 4

| | |
|---|---|
| 7 | access server |
| 13 | network element |
| 17-18 | service elements |
| 21-25 | servers |
| 29 | data base |
| 44 | service element |
| 70 | control unit |
| 71-76 | mediation units |
| 81-83 | network elements |
| 84-87 | service elements |
| 130 | control unit |
| 181 | service logic |
| 182-183 | interface units |
| 211 | control unit |
| 240 | control unit |
| 441 | service logic |
| 442-443 | interface units |
| 701 | registration unit |
| 702 | control unit |
| 711-714 | interface units |
| 741-744 | interface units |
| 742 | mediation function |

ACCESS SERVER FOR WEB BASED SERVICES

BACKGROUND OF THE INVENTION

The invention is based on a priority application EP 02 360 320.2 which is hereby incorporated by reference.

The invention is related to an access server for integrating web based services in an existing telecommunication network service environment comprising one or several non web based telecom service elements, and to a method for integrating web based services in an existing telecommunication network services environment comprising one or several non web based telecom service elements.

In modern telecommunication networks, it has become more and more important to be able to provide enhanced telecommunication services. A typical enhanced service is a conditional call forwarding which requires an analysis of the call situation and routs the call on the basis of the stored service profile of the call forwarding. To provide such kind of services, the so-called IN network architecture is used (IN=intelligent network). This architecture can be incorporated in the basic network and makes the implementation and controlling of services faster, easier and more flexible. This is achieved by moving the service control out of the switching exchange into a separate functional unit called service control point (SCP).

For fixed networks, CCITT Q.1290 proposes following IN architecture: A service control point communicates with a plurality of service switching points (SSP). A service switching point is an exchange fulfilling a service switching function (SSF) which recognizes trigger definitions of intelligent network services and activate an interaction with the service control point when detecting the fulfillment of trigger criteria. The number 7 signaling system (SS7) and the TCAP protocol (TCAP=Transaction Capabilities Application Part) is used for the communication between the service switching points and the service control point.

Further, it is known to use the IN architecture for wireless communication networks. A mobility controller is provided to enable access by mobile subscribers in a cellular telecommunications network. The cellular telecommunications network includes a home location register (HLR) which includes a data base of subscriber information including location information and a subscriber profile. The HLR and the SCP communicate via a TCAP-based communications protocol.

SUMMARY OF THE INVENTION

It is the object of the present invention to improve the provisioning of services within communication networks.

The object of the present invention is achieved by an access server for integrating web based services in an existing telecommunication network services environment comprising one or several non web based telecom service elements, wherein the access server comprising at least one first mediation element for: receiving a service request from a web based service element, the request using a web based protocol; converting the received service request to a telecom service request and transmitting the telecom service request to a corresponding telecom service element using an appropriate telecom protocol; receiving service data replied from the telecom service elements; and transmitting said service data using that web based protocol. The object of the present invention is further achieved by a method for integrating web based services in an existing telecommunication network services environment comprising one or several non web based telecom elements, wherein the method comprising the steps of: registering a non web based telecom service element in a web based description service to make known service properties of said service element to web based service elements; sending a service request from a web based service element to an access server, the request using a web based protocol; converting the service request in said access server to a telecom service request and transmitting said telecom service request to a corresponding telecom service element using an appropriate telecom protocol; transmitting service data from the telecom service element to the access server; and transmitting, at the access server, that received service data using the web based protocol.

Various advantages are achieved by this invention: Service creation and provisioning become more efficient and integration of new services is simplified. Further, it enables the development of network independent services based on a web service architecture. Services become portable, which improves the possibilities to reuse software blocks. Further, it allows the cooperation of web services and telecom oriented services. It provides an environment to transparently integrate web services into existing telecommunication networks. Further, it is not longer necessary to adapt the software of a plurality of network elements when implementing new services. New services can easily be introduced as add-on.

Further advantages are achieved by the embodiments indicated by the dependent claims.

According to a preferred embodiment of the invention, the at least one first mediation element transmits said service data to the service data element and returns the resource address to the web based service element. This makes it possible to separate data flows from control flows. The data flow architecture as well as the control flow architecture is harmonized. Data of the web based services are centralized which simplifies the provisioning of security and safety features and increase efficiency of the whole data holding system. Further, data may be reused or shared by different web-based service elements which simplifies the cooperation of web-based service elements, decreases costs of web service element development and improves the consistency of the whole system. Data of web based services are consolidated in a homogeneous data base which provides a high availability, high guarantee against data loss and simplified back-up features.

But, it is also possible, that the at least one first mediation element directly transmits the service data to the web based service element.

According to further preferred embodiment of the invention, the access server comprises a registration unit for registering a telecom service element in a web based description server to make known service properties of the telecom service element to web based service elements. This makes it possible to easily introduce new telecom service elements in the web based service provisioning environment. Further, it ensures that newly launched web based service elements get a complete overview of all available telecom service elements. Thereby, it improves and simplifies the introduction of new services.

The introduction of new services and the self-configuration of new services are further improved by the following feature:

The access server comprises a control unit for: receiving a service address, which identifies a telecom service element, from a web based service element, using the web based protocol; and transmitting a service descriptor of the identified telecom service element, the service descriptor describes how to communicate with the mediation element assigned to the addressed telecom service element.

Preferable, the accessed server comprises a dedicated first mediation element for each telecom service element registered in the web based service description server. This simplifies the process flow of the access server.

According to a preferred embodiment of the invention, the access server comprises, in addition to the at least one first mediation element, at least one second mediation element for: receiving service requests from a telecom service element, the requests using a telecom protocol; converting a received service request to a web based service request and transmitting said web based service request to a corresponding web based service element using the web based protocol; receiving service data; and transmitting said service data using said telecom protocol. Thereby, it becomes possible that web based service elements may be invoked by telecom service elements. web based services elements and telecom service elements may interact in a fully transparent way.

To achieve the above described advantages concerning the separation of control flow and data flow, the at least one second mediation unit is adapted to receive a resource address from the web based service and access a central service data element by transmitting said resource address to said central service data element. Thereby, the separation of data flow and control flow becomes transparent for both, invoking and invoked telecom service element.

The introduction of new services is improved by the following concept: The at least one second mediation element contacts a web based description server for receiving information about available web-based service elements.

BRIEF DESCRIPTION OF THE DRAWINGS

These as well as other features and advantages of the invention will be better appreciated by reading the following detailed description of presently preferred exemplary embodiments taken in conjunction with accompanying drawings of which.

Figure 1:
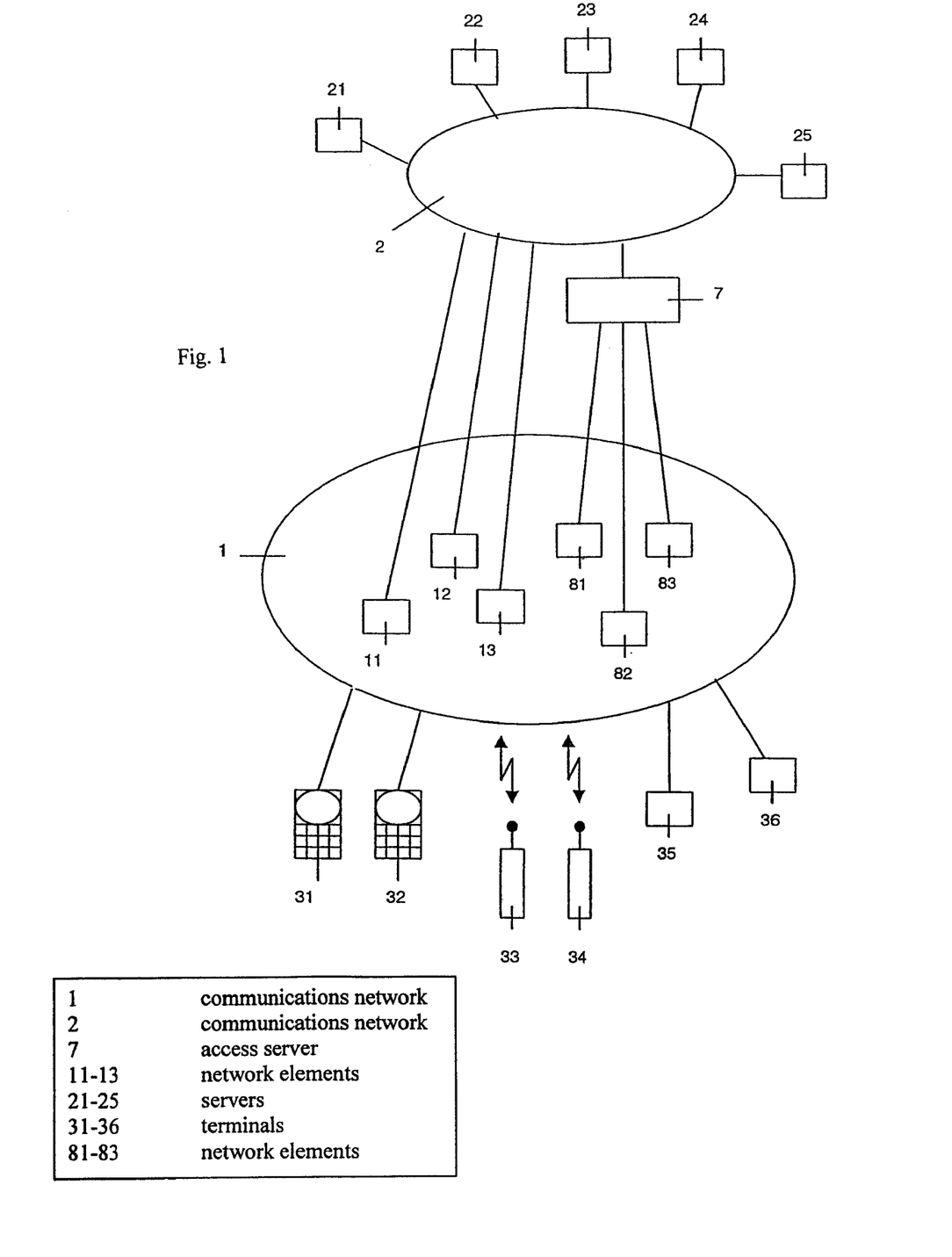
FIG. 1 is a block diagram which shows a communication network with a service provision system.

FIG. 1 shows a communication system 1, a plurality of terminals 31 to 36 connected to the communication network 1, a communication network 2, an access server 7 and several servers 21 to 25 connected with the communication network 2.

The communication network 1 is a telecommunications network which provides telecommunication services to the terminals 31 to 36. For example, the communications network 1 is constituted by several fixed circuit switched networks and mobile circuit switched networks which may be assigned to different network operators or may base on a different technology. Fixed networks may be PSTN networks or ISDN networks (PSTN=Public Switched telecommunications Network; ISDN=Integrated Services Digital Network). Mobile networks may be cellular networks as GSM networks or UMTS networks (GSM=Global System for Mobile Communication; UMTS=Universal Mobile telecommunications System). Further, it is possible that the communications network 1 provides beside circuit switched communication services also packet switched communication services dedicated to the transportation of data traffic.

Beside data transport services, the communication network 1 provides further enhanced telecommunication services to the terminals 31 to 36. Such services might be routing services, messaging services, information services etc.

The terminals 31 to 36 are terminals adapted to communicate with the communications network 1. The terminals 31 and 32 are computers connected via digital subscriber lines with the communications network 1. The terminals 33 and 34 are cellular mobile phones communicating with the communications network 1 via an air interface. The terminals 35 and 36 are PSTN telephone sets connected with the communications network 1 over a respective subscriber line.

The servers 21 to 25 are respectively formed by one or several interconnected computers constituting a hardware platform, a software platform and a plurality application programs executed based on the system platform provided by the hardware and software platform.

The communication network 2 is a data network. For example, this data network is an IP network, which uses an IP protocol as level 3 protocol (IP=Internet Protocol). Physically, the data network 2 may be formed by several ATM-networks and ETHERNET networks (ATM=Asynchronous Transfer Mode). These physical networks may use different MAC protocols (MAC=Medium Access Protocol). Further, the TCP/IP protocol stack (TCP=Transmission Control Protocol) may be used to enable the communication between the servers 21 and 25.

The communications network 1 comprises a plurality of network elements which provide the network functionalities necessary to provide the communication services offered by the communications network 1. Network elements are for example exchanges, routers or gateways.

But, it is also possible that network elements are network service nodes, network management nodes or service management nodes.

FIG. 1 shows three network elements 11, 12 and 13 that are directly connected with the communication network 2 and three network elements 81, 82 and 83 that are connected with the communication network 2 via the access server 7.

The network elements 11 to 13 may contain functions for processing the TCP/IP protocol stack to be able to communicate with the servers 21 to 25. Further, it is possible that the network elements 11 to 13 communicate via the Number 7 signaling protocol and are linked with the communication network 2 through a gateway performing the necessary protocol conversions.

The network elements 11 to 13 and 81 to 83 comprise one or several service elements assigned to the respective network element. Further, the servers 22 to 24 respectively comprise one or several service elements.

The server 21 is a description server. The server 25 provides a central service data element.

Figure 2:
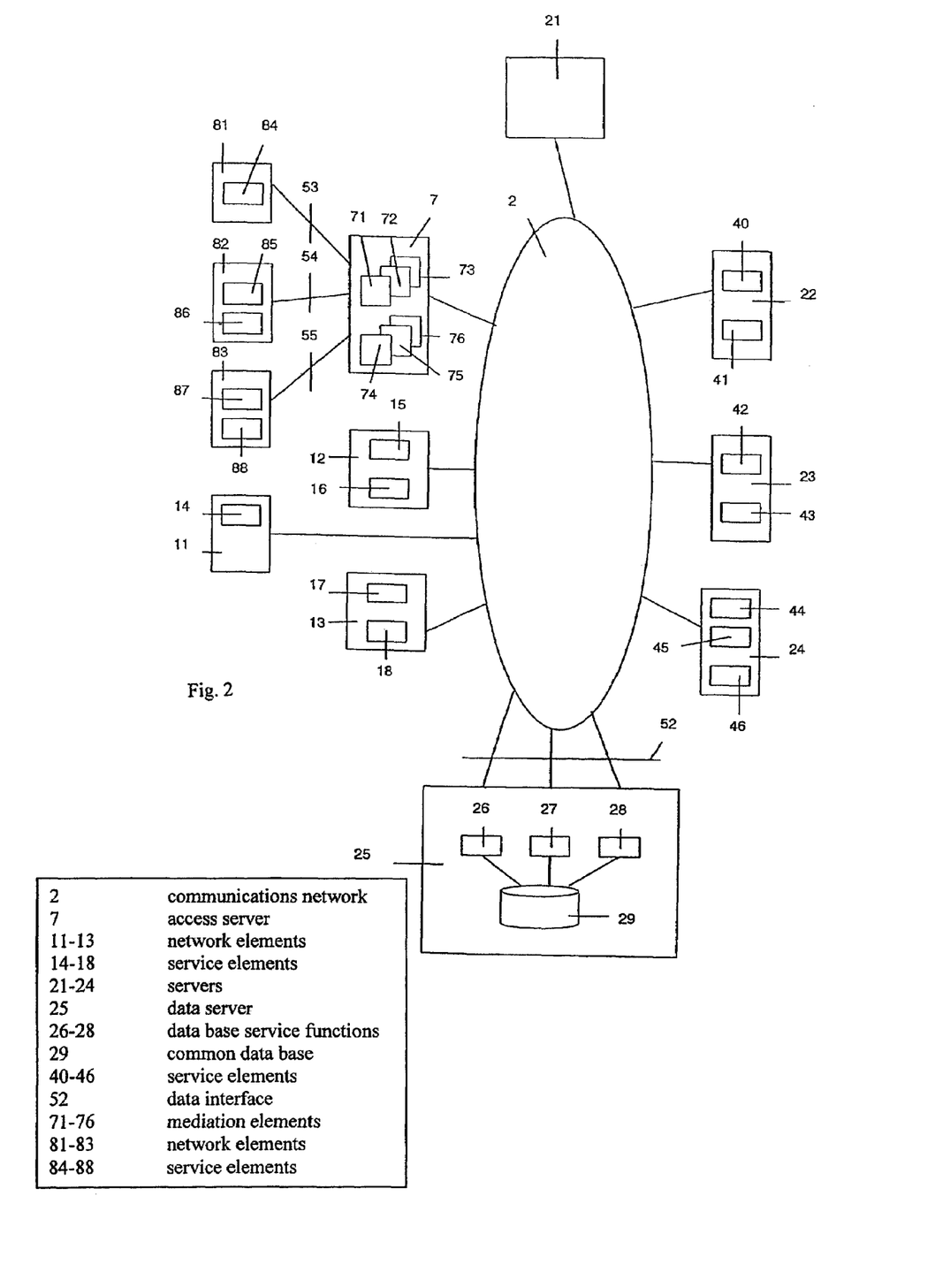
FIG. 2 is a block diagram which shows the detailed structure of the service provision system of FIG. 1.

The details of the network elements 11 to 13, the network elements 81 to 83, the servers 21 to 25, and the access server 7 are now described by hand of FIG. 2.

FIG. 2 shows the communications network 2, the servers 21 to 25, the access server 7 and the network elements 11 to 13 and 81 to 83.

The network elements 11 to 13 comprise service elements 14, 15 and 16, and 17 and 18, respectively. The network elements 81 to 83 comprise service elements 84, 85 and 86, and 87 and 88, respectively.

The service elements 14 to 18 and 84 to 88 are network element applications, executed by the corresponding system platform of the respective network elements 11 to 13. The service elements 14 to 18 and 84 to 88 fulfill a corresponding network function, network service function or network management functions within the respective network element 11 to 13 and 81 to 83, respectively.

The service elements 14 to 18 are web based service elements and the service elements 84 to 88 are telecom service elements.

Telecom service elements are service elements interacting via a telecom specific API (=Application Program Interface). For example, a telecom service elements may be a SSF or a SCF functionality, interacting via a INAP interface, a HLR or VLR functionality, interacting via a MAP interface, a GGSN functionality interacting via a Gi interface, a MSC functionality interacting via a MAP interface or a GMLC functionality interacting via a Le interface (MSC=mobile switching center; HLR=home location register; VLR=visitor location register; SCF=service control function; SSF=service switching functionality; GGSN=Gateway GPRS Support Node, GMLC=Gateway Mobile Location Center, MAP=Mobile Application Part).

Web based service elements are service elements interacting via an object oriented, non telecom specific interface. For example, they may use the SOAP protocol which is designed for the provisioning of WEB-services. Further, it is possible to use CORBA based protocols, DCOM based protocols (DCOM=distributed common object model) or Java based protocols and frameworks.

For example, the web based service element 14 may be a SSF functionality, a CSCF functionality, a MSC functionality, a HLR functionality, a VLR functionality, a SMSC functionality, a SCP functionality, a MSC functionality or a CSCF functionality interacting via such an API (MSC=mobile switching center; HLR=home location register; VLR=visitor location register; SCP=service control point; SSF=service switching functionality; CSCF=call state control function; SMSC=short message service center).

The servers 22 to 24 comprise service elements 40 and 41, 42 and 43, and 44 to 46, respectively.

The service elements 40 to 46 are service applications providing telecommunication services. For example, the service elements 40 to 46 respectively provide one of the following functions: mobility service, GPRS service, WAP service, VLR functionality, SMS function, CRM function, BSS function, location service or maintenance service (GPRS=general packet radio service; WAP=wireless access protocol; SMS=short message service; CRM=customer relationship management; BSS=base station subsystem).

Further, the service elements 40 to 46 can be formed by service elements comprising the service logic of enhanced telecommunication services, for example a universal number service, a customer information service, a traffic information service, location based services etc.

Further, it is possible that the service elements 40 to 46 are network management functionalities, service management functionalities or business applications.

Further, it is possible that some of the service elements 40 to 46 provide specialized service application functions and some of the service elements 40 to 46 provide common service functions. The common service functions may be accessed and used by the specialized service application functions.

The service elements 14 to 18 and 40 to 46 are web based service elements and the service elements 84 to 88 are telecom service elements. The telecom service elements 84 to 88 communicate via telecom specific protocols with the access server 7. The web based service elements communicate via a common web based protocol with each other, with the description server 21 and with the access server 7. For example, they may use the SOAP protocol, CORBA based protocols, DCOM based protocols, Java based protocols and frameworks, or any other kind of object oriented protocols. Further, the web based service elements communicate via a data interface 52 with the data server 25.

The server 25 provides a central service data element. It comprises several data base service functions 26 to 28 and a common data base 29. Each of the data base service functions 26 to 28 provides access to the commoner data base 29.

It is possible to replace the server 25 by several locally distributed servers, each holding the data base 29. These distributed servers are synchronized to hold the data base 29 consistent.

For example, the server 25 is a storage area network (SAN) which provides a standardized way to hold the data base 29 consistent.

The access server 7 comprises one or several first mediation elements and one or several second mediation elements. For example, FIG. 2 shows three first mediation elements 74 to 76 and three second mediation elements 71 to 73.

Each first and second service element is associated to a dedicated telecom service element.

A first mediation element receives a service request from a web based service element, the request using a web based protocol, converts the received service request to a telecom service request and transmits said telecom service request to a corresponding telecom service element using an appropriate telecom protocol. In the following, it receives service data replied from the telecom service element and transmits said service data using said web based protocol.

But, it is also possible that the access server 7 does only contain first mediation elements. Further, it is possible that mediation elements are associated to more than one service element or that a first mediation element does also perform the functionalities of a second mediation element.

The details of the above described system are in the following described by hand of FIG. 3 and FIG. 4.

Figure 3:
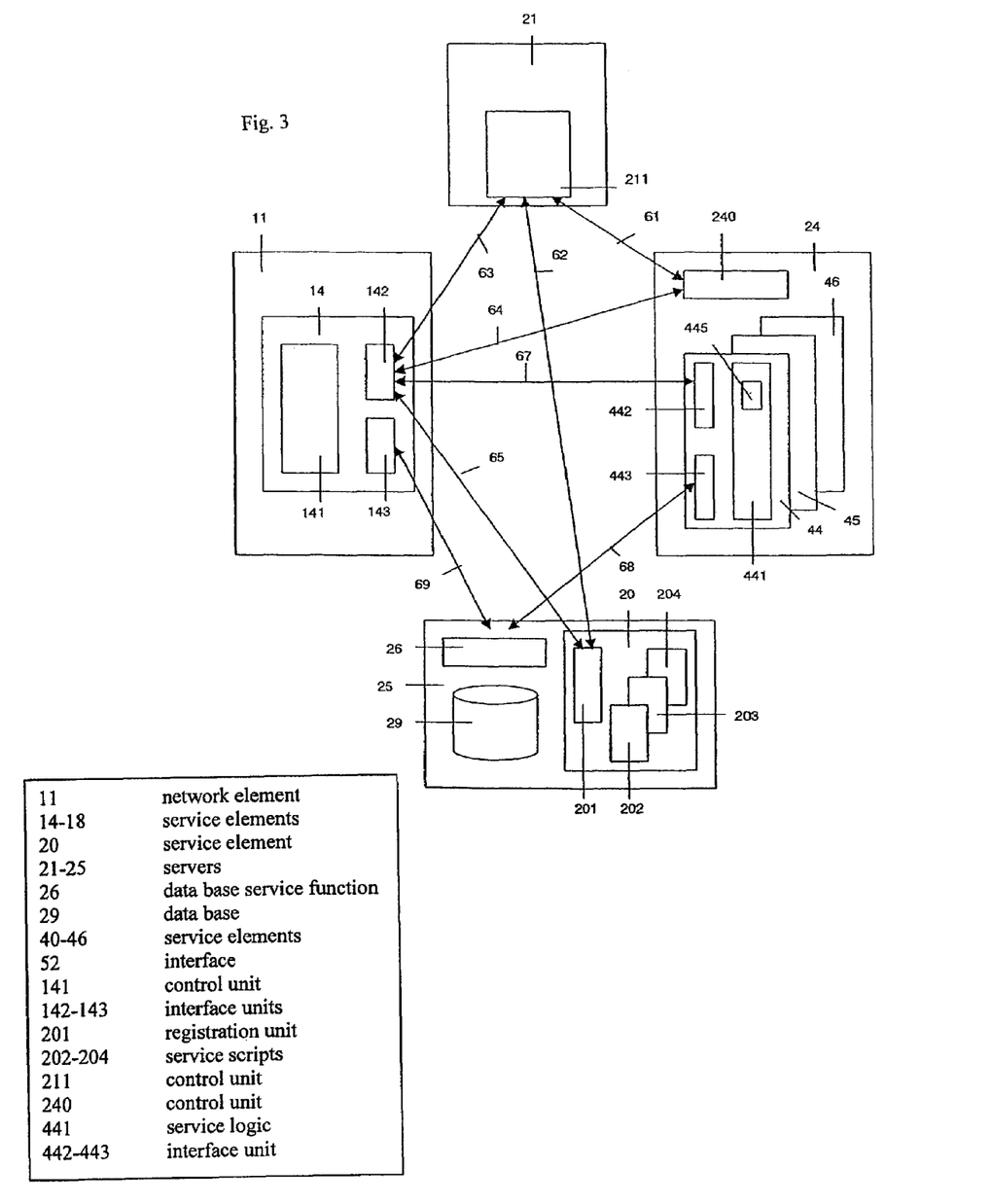
FIG. 3 is a block diagram which shows a first part of the service provision system of FIG. 2.

FIG. 3 shows the network element 11 and the servers 21, 24 and 25. The server 21 is a description server, the server 24 is a service element server and the server 25 is a service data server.

The server 25 comprises the database service function 26, the data base 29 and a service element 20. The database service function 26 and the data base 29 provide the central service data element which manages and administrates service data stored in the database 29.

The description server 21 comprises a control unit 211. Further, it may comprise a database, which contains service addresses and descriptions of registered service elements. But, according to a preferred embodiment of the invention, all data of the description server 21 are stored and administrated by the data base server 25. As described for the server 24, the data of the description service offered by the server 21 is separated from the processes of this service. The data are hold by the service data element provided by the server 25 and the service processes and functions are performed by the description server 21.

The control unit 211 offers the above mentioned information to the service elements 14 to 18 and controls the registration of service elements, for example of the service elements 14 to 18 and 40 to 46.

The network element 11 comprises the service element 14 which is a MSC network function. From functional point of view, the service element 14 comprises a control unit 141 and two interface units 142 and 143.

The server 24 comprises the service elements 44 to 46 and a control unit 240. The service element 44 provides a HLR service. From functional point of view, it comprises a service logic 441 and two interface units 442 and 443.

The data of the HLR functionality is separated from the processes of the HLR functionality. The code implementing the processes of the HLR functionality constitutes the service logic 441. The associated service data of the HLR functionality is stored in the database 29. These data may be encoded as objects.

Further, the database 29 stores the data according to a common data model which is known to all the web based service elements 14 to 18 and 41 to 46 and to the mediation elements. Accordingly, the data of the HLR functionality is encoded according to this common data model and stored, following the data structure of this data model. This makes it possible that the data of the HLR functionality may be not only accessed, used and understood by the service element 44, but also by all other web based service elements and all mediation elements.

The service logic 441 contains all the processes and therefore all of the functions of the HLR functionality. The processes/functions have to access the corresponding service data of the HLR functionality. This is done by mean of the interface unit 443 which provides the necessary functions to communicate with the control unit 26 of the common service data element via the interface 52. For example, SQL, XML or CORBA interactions (SQL=System Query Language; XML=Extended Markup Language; CORBA=Common Object Request Broker Architecture) are used to perform this communication. Further, it is also possible to use the SOAP protocol (SOAP=Service Oriented Architecture Protocol). Preferably, the used communication protocol is adapted to provide a fast access to the data of the database 29.

Further, the service logic 441 communicates via the interface unit 442 with other web based service elements, for example with the service elements 14 to 18 or 40 to 46. Further, it communicates via the interface unit 442 with the access server 7 and with the description server 21. The interface unit 442 communicates via a protocol that is different from that of the interface unit 443. It may use the SOAP protocol which is designed for the provisioning of WEB-services. Further, it is possible to use CORBA based protocols, DCOM based protocols (DCOM=distributed common object model) or Java based protocols and frameworks.

The interface unit 142 of the service element 14 and the control unit 211 of the description server 21 comprise the same functionalities as the interface unit 442 of the service element 44, which makes it possible that the service elements 44, 14 and the description server 21 communicate via the above described framework.

The interface unit 143 of the service element 14 comprises the same functionalities as the interface unit 443 of the service element 44, which enables the service element 14 to retrieve data stored in the data base 29.

The control unit 240 performs the registration of the service elements 44, 45 and 46 of the server 24. It comprises the same functionalities as the interface unit 442 and is able to communicate with the description server 21 with web based service elements and with mediation elements. If the control unit 240 recognizes the creation of a new service element hosted by the server 24, it automatically performs the following registration process:

It contacts the description server 21. After performing an authorization procedure, it transfers, as part of a communication 61, a service address of the new service element and description data assigned to the new service element to the description server 21. This description is, in contrast to the later described service descriptor, a rough, high level description of the service provide by the new service element. The end point of the communication 61 is the control unit 211 of the description server 21. The control unit 211 stores the received data in the database 29. In the following, it offers the new data to all service elements contacting the description server 21.

The service address delivered to the description server 21 may be the network address of the server 24. But it is also possible that it directly addresses the respective service element hosted by the server 24.

Further, the control unit 240 holds service descriptors of the service elements hosted by the server 24. The service descriptors describe how to communicate with the respective second service element. A service descriptor may comprise information about parameters, formats and contents of service requests which has to be used to invoke the service provided by the respective service element.

Further, it is also possible that data administrated by the central service data element are registered as available service.

To perform such functionality, the data server 25 comprises the service element 20. The service element 20 contains several service scripts 202 to 204 and a registration unit 201. The service scripts 202 to 204 describe that data of the database 29 which should be made available to service elements. Further, it also contains a description file describing the respective kind of service offered by the data. When detecting the installation of a new service script, the registration unit 201 performs following registration procedure:

It contacts the description server 21. It submits, as part of a communication 62, a resource address of the respective data to the description server 21. Further, it submits the service description. The control unit 211 stores the resource address and the associated description in the data base 29. In the following, the description server 21 offers the access to these data as service to the service elements and to the mediation elements contacting the description server 21.

To be informed about the available services of the service, the service element 14 contacts the description server 21. It receives, as part of a communication 63, service description information offered by the description server 21. For example, it downloads the description files of the service elements 40 to 46. The description files may be, for example, encoded in an interface description language.

Then, the service element 14 selects one or several of these service elements by means of the service description information received from the description server 21. When receiving the selection information, the description server 21 replies the service address of the selected service elements.

The service element 14 accesses the server addressed by the received service address. For example, it accesses the server 24 for the service element 44. Such kind of request is handled by the control unit 240 of the server 24. It replies, as part of a communication 64, the service descriptor of the addressed service element, for example the service descriptor of the service element 44. By the information contained in the service descriptor, the service element 14 is in a position to generate service requests for invoking the respective service element.

For example, the service element 14 invokes the service element 44 by means of the fetched service descriptor. A corresponding service request is sent, as part of a communication 67, from the service element 14 to the service element 44. The service logic 441 is triggered and executes the service process of the service element 44. When executing this process, the service element 44 accesses the service data element, which is provided by the server 25, one or several times to retrieve the necessary processed data. Even, it transmits, as part of a communication 68, the results of the processing from the service element 44 to the service data element.

Having service processing finalized, the service logic 441 replies, as part of a communication 67, a resource address of the service data element to the service element 14. The resource address identifies service data, which represents results of the service processing, within the data structure of the database 29.

The service element 14 accesses the service data element, which is provided by the server 25, and transmits, as part of a communication 69, the received resource address to the service data element. The data management function 26 replies the addressed service data representing the results of the service processing performed by the service element 44.

But, it is also possible that the service logic 441 replies all the results or a part of the results within the communication 67.

Further, it is possible that security features are performed by the service element 44:

The service logic 441 comprises a service security element 445 assigning access rights to service element. For example, the security element 445 performs an authentication and/or authorization procedure, when the service element 44 is invoked by one of the service elements 14 to 18. It compares the determined identity of the invoking service element with the entries of an access right allocation data base. According to these entries, it grants to different service elements different access rights.

Dependent on the granted access right, it performs the invoked service or rejects the provisioning of the service.

Further, following mechanism could be implemented:

A service element informs the requesting service element about the resource address and further informs the service data element about the identity of the invoking service element. Only, if both parts fit together, the service data element grants access to the requested service data.

Further, it is possible that the service provision system comprises a central service security element. This service security element is contacted by first service elements to gain a security ticket defining access rights to second service element. If a first service element contacts one of the second service elements, the respective second service element checks the security ticket of this first service element and grants access rights according to this security ticket.

In the following, the details of the access server 7 are described with FIG. 4.

Figure 4:
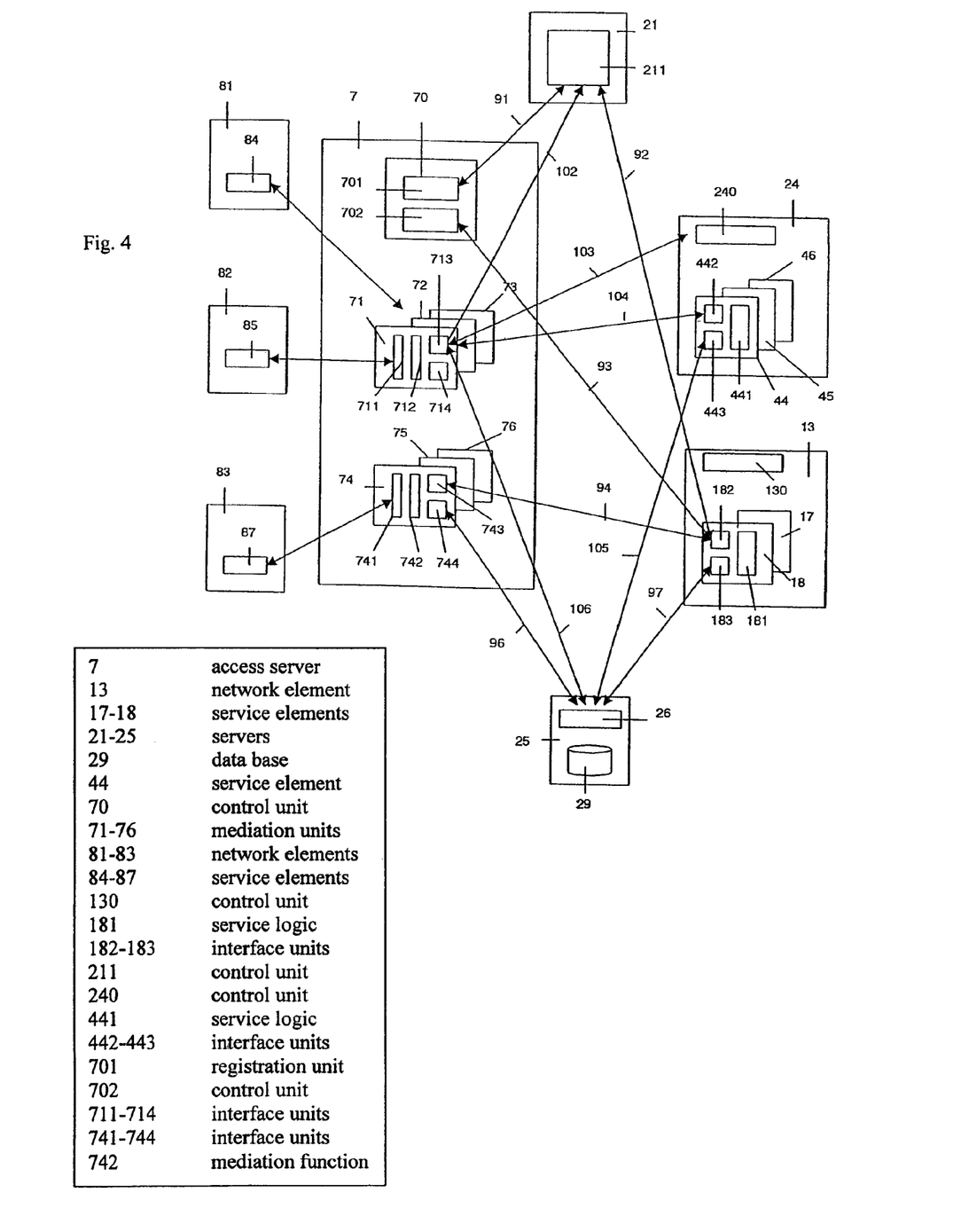
FIG. 4 is a block diagram which shows a second part of the service provision system of FIG. 2.

FIG. 4 shows the network elements 81 to 83 and 13, the servers 21, 24 and 25 and the access server 7.

The description server 21, the data server 25 and the server 24 provide functionalities according to FIG. 3.

The server 13 comprises the service elements 17 and 18 and a control unit 130. From the functional point of view, the service element 18 comprises a service logic 181 and two interface units 182 and 183. The control unit 130 and the interface units 182 and 183 provide the functionalities of the control unit 240 and the interface units 442 and 443 according to FIG. 3.

The network elements 81 to 83 comprise the service elements 84 to 87, respectively. The service element 87 provides a SCF network service function, the service element 85 is a MSC network function and the service element 84 provides a HLR network function.

The access server 7 comprises a control unit 70, the first mediation units 74 to 76 and the second mediation units 71 to 73. The mediation elements 71, 72 and 74 are responsible for the service elements 84, 85 and 87, respectively.

The control unit 70 performs functionalities similar to that of the control unit 240 according to FIG. 3. It comprises a registration unit 701 which registers telecom service elements in the web based description server 21. It comprises a control unit 702 which submits on request service descriptors identifying telecom service element to web based service elements.

The mediation element 71 comprises a mediation function 712 and three interface units 711, 713 and 714. The mediation element 74 comprises a mediation function 742 and three interface units 741, 743 and 744. The interface units 713 and 743 performs the functions of the interface unit 442 of FIG. 3 and enable to communicate via the web based protocol. The interface units 714 and 744 perform the functions of the interface unit 443 and enable to communicate with the service data element provided by the data server 25 and retrieve data from the data base 29. The interface units 711 and 741 perform functions for communicating via telecom protocols with the service elements 85 and 87. The interface unit 741 enables the communication via the INAP protocol. The interface unit 711 enables the communication via the MAP protocol.

If the control unit 70 recognizes the provisioning of a new telecom service element, for example the service element 87, it performs following procedure to enable the visibility of this service element:

It creates one or several dedicated mediation elements, for example the mediation element 74. Whether a first mediation element and/or a second mediation element is created for a new telecom service element depends on the characteristics of the telecom service element as service element, which consumes and/or offers services.

It performs a registration procedure for registering the new telecom service in the web based domain:

The registration unit 701 contacts the description server 21. After performing an authorization procedure, it transfers, as part of a communication 91, a service address representing the dedicated mediation element 741 and description data assigned to the new telecom service element. The control unit 211 stores the received data in the database 29. In the following, it offers the data to all web based service elements and all mediation elements which contacts the description server 21.

The service address delivered to the description server 21 may be the network address of the access server 7. But, it is also possible that it directly addresses the respective mediation element hosted by the access server 7.

Further, the control unit 702 holds service descriptors of telecom service elements accessible via the access server 7. For example, it holds the service descriptor of the first mediation elements 74 to 76. The service descriptors describe how to communicate with the respective mediation element assigned to the telecom service element.

To be informed about available telecom services, the service element 18 contacts the description server 21. It receives, as part of a communication 92, service description information offered by the description server 21. For example, it downloads the description files of the telecom service elements 87 and 88. The service element 18 selects the telecom service element 87 and the description server 21 replies the service address of the mediation element 74.

The service element 18 accesses the server 7 for the mediation element 71. The control unit 702 replies, as part of a communication 93, the service descriptor of the mediation element 74. By the information contained in the service descriptor, the service element 18 is in a position to generate service requests for invoking the mediation element 74.

The service element 18 invokes the service mediation element 74 by means of the fetched service descriptor. A corresponding service request is sent, as part of a communication 94, from the service element 18 to the mediation element 74. The mediation function 742 is triggered and converts the service request to one or several telecom service requests. The web based service request is translated to an INAP invocation which requests the provisioning of the service provided by the telecom service element 87. This service request is sent, as part of a communication 95, to the telecom service element 87, which executes the service process and replies, as part of the communication 95, the results of the service processing to the mediation element 74.

The mediation function 742 sends the results, as part of a communication 96, to the service data element and replies, as part of the communication 94, the resource address of the result to the service element 18. The service element 18 accesses the service data element and transmits, as part of a communication 97, the received resource address to the service data element. The data management function 26 replies the addressed service data representing the results of the service processing performed by the telecom service element 87.

But, it is also possible that the mediation function 742 replies all the results or a part of the results within the communication 94.

Following procedure is performed, when a telecom service element, for example the service element 85, invokes a web based service element:

The telecom service element 85 sends a service request to the mediation element 71, using a telecom protocol. The mediation element 71 receives this request, for example a MAP request, as part of a communication 101. The mediation function 712 contacts the description server 211 and receives, as part of a communication 102, the service address of a suitable web based service element. For example, it receives the service address of the service element 44, fetches the associated service descriptor in a communication 103 and invokes the service element 44 in a communication 104.

It is also possible that the mediation function has already knowledge of a suitable web based service element and does not execute the communications 102 and 103.

The service logic 441 is triggered, executes the service process and transmits the results, as part of a communication 105, to the service data element. Further, it replies, as part of the communication 104, the resource address of the results to the mediation function 712. The mediation function 712 accesses the results in a communication 106 and transmits the results, as part of the communication 101, to the service element 85.

It is also possible that the service logic 441 replies all the results or a part of the results within the communication 104

The invention claimed is:

1. An access server for integrating web based services in an existing telecommunication network service environment comprising one or several non web based telecom service elements, the access server comprising:
at least one first mediation element that: receives a first service request from a first web based service element, the request using a first web based protocol; converts the received first service request to a telecom service request and transmits said telecom service request to a corresponding first telecom service element using an appropriate first telecom protocol; receives first service data replied from the first telecom service element containing information requested in said telecom service request; and transmits said first service data using said first web based protocol;
a registration unit that registers telecom service elements in a web based description server to make known service properties and service addresses of said telecom service elements to web based service elements; and
at least one second mediation element that: receives a second service request from a second telecom service element, the request using a second telecom protocol; converts the received second service request to a web based service request and transmits said second web based service request to a corresponding second web based service element using the second web based protocol; receives second service data; and transmits said second service data using said second telecom protocol,
wherein the access server integrates web based services for the non web based telecom service elements.

2. The access server according to claim 1, wherein the at least one first mediation element is adapted to transmit said service data to the first web based service element.

3. The access server according to claim 1, wherein the at least one first mediation element is adapted to transmit said first service data to a central service data element and return a resource address to the first web based service element.

4. The access server according to claim 1, wherein
the access server further comprises a control unit that: receives a service address, which identifies a third telecom service element, from a web based service element, using the web based protocol; and transmits a service descriptor of the identified third telecom service element, the service descriptor describes how to communicate with the mediation element assigned to the addressed telecom service element.

5. The access server according to claim 1, wherein
the access server comprises a dedicated first mediation element for each telecom service element registered in a web based description server.

6. The access server according to claim 1, wherein
the at least one second mediation element is adapted to receive a resource address from said second web based service element and access a central service data element by transmitting said resource address to said central service data element.

7. The access server according to claim 1, wherein
the at least one second mediation element contacts a web based description server that receives information about available web-based services elements.

8. The access server according to claim 1, wherein a plurality of telecom service elements are registered in a web based description server and wherein the access server comprises a dedicated first mediation element for each telecom service element registered in a web based description server.

9. The access server according to claim 1, wherein the telecom service element comprise at least one of exchanges, routers, and gateways of a non web enabled network and wherein the web based service element communicate via at least one of SOAP protocol, CORBA protocol, and DCOM protocol.

10. A method that integrates web based services in an existing telecommunication network service environment comprising one or several non web based telecom service elements, the method comprising:
registering a non web based telecom service element in a web based description server to make known service properties of said non web based telecom service element to web based service elements;
sending a first service request from a web based service element to an access server, the first request using a first web based protocol;

converting the first service request in said access server to a first telecom service request and transmitting said first telecom service request to a corresponding first telecom service element using an appropriate first telecom protocol;

transmitting first service data containing information requested in said first telecom service request from the first telecom service element to the access server;

transmitting, at the access server, said received first service data using the first web based protocol, sending a second service request from a second telecom service element to the access server, the second request using a second telecom protocol;

converting the service request in said access server to a second web based service request and transmitting said second web based service request to a corresponding second web based service element using an appropriate second web based protocol;

transmitting second service data containing information requested in said second web based service request from the second web based service element to the access server; and transmitting, at the access server, said received second service data using the second telecom protocol, wherein the method integrates web based services in the existing telecommunication network service environment.

11. A telecommunication network service system comprising:

at least one non web based telecom service element;

at least one web based service element; and an access server which integrates web based services by:

receiving a first service request from a first web based service element from the at least one web based service elements, the first request using a first web based protocol, converting the first received service request to generate a first telecom service request, transmitting said generated first telecom service request to a first telecom service element from the at least one telecom service elements using an appropriate telecom protocol, receiving first service data replied from the first telecom service element, and transmitting said first service data to the first web based service element using said first web based protocol;

wherein the access server integrates telecom based service elements by:

receiving a second service request from a second telecom service element from the at least one telecom service elements, the second request using a telecom protocol, converting the received second service request to generate a second web based service request, transmitting said generated second web based service request to a second web based service element using an appropriate second web based protocol, receiving second service data replied from the second web based service element, and transmitting said second service data to the second telecom service element using said second telecom protocol;

wherein the access server further comprises a registration unit that registers telecom service elements in a web based description server to make known service properties and service addresses of said telecom service elements to web based service elements.

* * * * *

UNITED STATES PATENT AND TRADEMARK OFFICE
CERTIFICATE OF CORRECTION

PATENT NO. : 7,577,747 B2  Page 1 of 1
APPLICATION NO. : 10/701620
DATED : August 18, 2009
INVENTOR(S) : Banet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1657 days.

Signed and Sealed this

Seventh Day of September, 2010

David J. Kappos
*Director of the United States Patent and Trademark Office*